United States Patent
Song et al.

(10) Patent No.: US 6,847,981 B2
(45) Date of Patent: Jan. 25, 2005

(54) SYSTEM AND METHOD FOR GENERATING EJB COMPONENTS FROM REUSABLE BUSINESS LOGICS IN SERVLET PROGRAM

(75) Inventors: Moon Sub Song, Taejon (KR); Hyo Taeg Jung, Taejon (KR); Moon Soo Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 166 days.

(21) Appl. No.: 10/359,581

(22) Filed: Feb. 7, 2003

(65) Prior Publication Data

US 2004/0103389 A1 May 27, 2004

(30) Foreign Application Priority Data

Nov. 27, 2002 (KR) ................................ 10-2002-0074396

(51) Int. Cl.[7] ............................................... G06F 17/30
(52) U.S. Cl. ...................................... 707/104.1; 707/10
(58) Field of Search ........................... 707/101, 104.1; 717/106, 107, 109, 113, 147

(56) References Cited

U.S. PATENT DOCUMENTS 5,960,200 A * 9/1999 Eager et al. ............... 717/147
6,389,588 B1 * 5/2002 Wadhwa et al. ........... 717/106

FOREIGN PATENT DOCUMENTS

KR 2001-96859 11/2001 .......... G06F/17/00

OTHER PUBLICATIONS

Jim Q. Ning, et al.; Recovering Reusable Components from Legacy Systems by Program Segmentation; 1993 IEEE; pp. 64–72.

* cited by examiner

Primary Examiner—Diane D. Mizrahi
Assistant Examiner—Apu Mofiz
(74) Attorney, Agent, or Firm—Piper Rudnick LLP

(57) ABSTRACT

Disclosed is a system and method for generating EJB components by extracting reusable business logic from servlet programs that is one of web program languages used in web-based applications. The system a servlet code analyzer that is a reverse engineering module for analyzing the existing servlet program source, a visualizer for visualizing the analyzed information, a business logic extractor for extracting a reusable business logic, and an EJB component generator for generating the EJB components using the extracted information. The servlet code analyzer considers the flexibility of coding permitted by the servlet program and the use of a multi-language, and the visualizer helps the understanding of the existing legacy program. The business logic extractor extracts the reusable module by extracting the business logic within many user interface related codes, and thus enable the reuse of software. The EJB component generator generates java codes in a jar file that can be deployed.

19 Claims, 6 Drawing Sheets

US 6,847,981 B2

SYSTEM AND METHOD FOR GENERATING EJB COMPONENTS FROM REUSABLE BUSINESS LOGICS IN SERVLET PROGRAM

BACKGROUND OF THE INVENTION

1. Field of the Invention

The present invention relates to a legacy system modernization technology for changing the existing legacy program to a program necessary for a new system, and more particularly, to a system and method that can analyze and visualize a servlet program so that the servlet program, which is a web-based program language highlighted as a dynamic web page development language, can be converted into a component-based system, and can extract business logics and generate enterprise java beans (EJB) components using the extracted business logic information.

2. Background of the Related Art

Generally, the modernization of the legacy system is required on the ground that the system environment is changed, or the manufacturing technique of software is changed for the improvement of productivity of the software. Especially, since the system is continuously changed in the current rapidly changing information technology (IT) field, the legacy system modernization is required. However, the current modernization of the legacy system has mainly been researched with respect to the Cobol, PL/1, etc., which are procedure-oriented languages, but no research has been made with respect to a web program language.

The legacy system modernization is briefly classified into redevelopment, wrapping, and transformation. The redevelopment is a method of newly developing a system having the same function as the existing system to substitute for the existing system. According to this method, the reuse is not performed at all on the software engineering side, but the existing system serves only as reference materials when the new system is developed. Also, in case that the business logic included in the existing program is important, it is difficult to authenticate whether the redevelopment of the business logic has been properly done, while in case that there is no document on the existing program, it is difficult to design a new system.

The wrapping method is a method of making the existing system be used in a new system environment by leaving the existing system as it is. According to this method, the existing program can stably be operated in the new environment.

The wrapping method has the advantages in that it is not necessary to know the structure and codes of the existing system in detail, its development cost is low, and its development term is short. However, since the programs are still operated in the existing platform, the performance that can be obtained in a new platform cannot be expected, and since the reuse can be made only as a whole through a wrapper, but cannot be partially made, the flexibility of the system is degraded.

The transformation is a method for achieving the modernization by changing the existing program to a new program through performing of an abstraction of the existing program to match the software technique of a new system. This method is ideal in the end, but since the systems of the existing and new systems are different from each other, its implementation may be difficult or impossible.

The present invention relates to the servlet program analysis, business logic extraction and EJB component generation required for the modernization of the legacy system with respect to the servlet program.

As a prior patent relating to the present invention, U.S. Pat. No. 6,389,588 "Method and system of business rule extraction from existing applications for integration into new application" discloses generation of a new application (C++, Java, Visual Basic) by extracting the business logic from the existing applications (procedure-oriented language: Cobol, PL/1, C).

Also, U.S. Pat. No. 5,960,200 "System to transition an enterprise to a distributed infrastructure" discloses a system for automatically converting source applications that operate in a two-tiered client/server system into a target application having a multi-tiered client/server structure.

Also, Korean Patent Laid-open No. 2001-96859 "Method of converting existing systems into a system useable on webs" discloses a method for solving problems generated when converting a system that does not match the existing webs or window environment into a system useable on webs, and an intellectual conversion method that can use the characteristics on the webs and remove unnecessary functions.

As described above, according to the prior art methods and systems, the modernization of the legacy system has mainly been researched with respect to the Cobol, PL/1, etc., which are the procedure-oriented languages, but no research has been made with respect to the web program language, and especially to the servlet. That is, the servlet program has the problems in that it is difficult to perform a re-abstraction of the servlet program at reverse engineering stages due to the flexibility of java languages and the construction of multi-languages, and it is impossible to reuse the servlet program since it is difficult to extract the components due to the disordered existence of the user interface for constructing a web page and the business logic.

SUMMARY OF THE INVENTION

Accordingly, the present invention is directed to a system and method for generating EJB components from reusable business logics in a servlet program, which substantially obviates one or more problems due to limitations and disadvantages of the related art.

It is an object of the present invention to provide a system and method for generating EJB components from reusable business logics in a servlet program that provides diagrams for a user's easy understanding of an existing system by analyzing source codes with respect to a servlet program, generates EJB components which are java-based components by extracting reusable business logics, and visualizes information on the generated EJB components to a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In order to achieve the above object, there is provided a system for generating enterprise java beans (EJB) components from reusable business logics in a servlet program, comprising a servlet code analyzer for receiving servlet codes, analyzing business logic information, SQL information and user interface (UI) information using a structural knowledge information, and storing analyzed information in an analyzed information database, a business logic extractor for extracting information required for generating the EJB components using the analyzed business logic information and SQL information from the servlet code analyzer, a visualizer for providing by way of diagrams and graphs servlet structure information received through the servlet code analyzer and component information extracted by the business logic extractor, and an EJB component generator for generating EJB codes in accordance with an EJB component specification using the extracted EJB component generation information.

In another aspect of the present invention, there is provided a method for generating enterprise java beans (EJB) components from reusable business logics in a servlet program, comprising analyzing structural information of servlet programs received from a servlet code analyzer and analyzed information required in other modules (such as a visualizer, a business logic extractor and an EJB component generator) and storing the analyzed information in an analyzed information database. The visualizer displays information on the servlet programs received from a user using the stored analyzed information, and the business logic extractor extracts reusable business logics, and provides the extracted information to the visualizer and the EJB component generator. The EJB component generator generates EJB beans and interface codes by completing an EJB component template using the extracted information, and after generating deployment descriptor (DD), ties them in a jar file.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

A system and method for generating EJB components from reusable business logics in a servlet program according to the preferred embodiment of the present invention will now be explained in detail with reference to the accompanying drawings.

Figure 1:
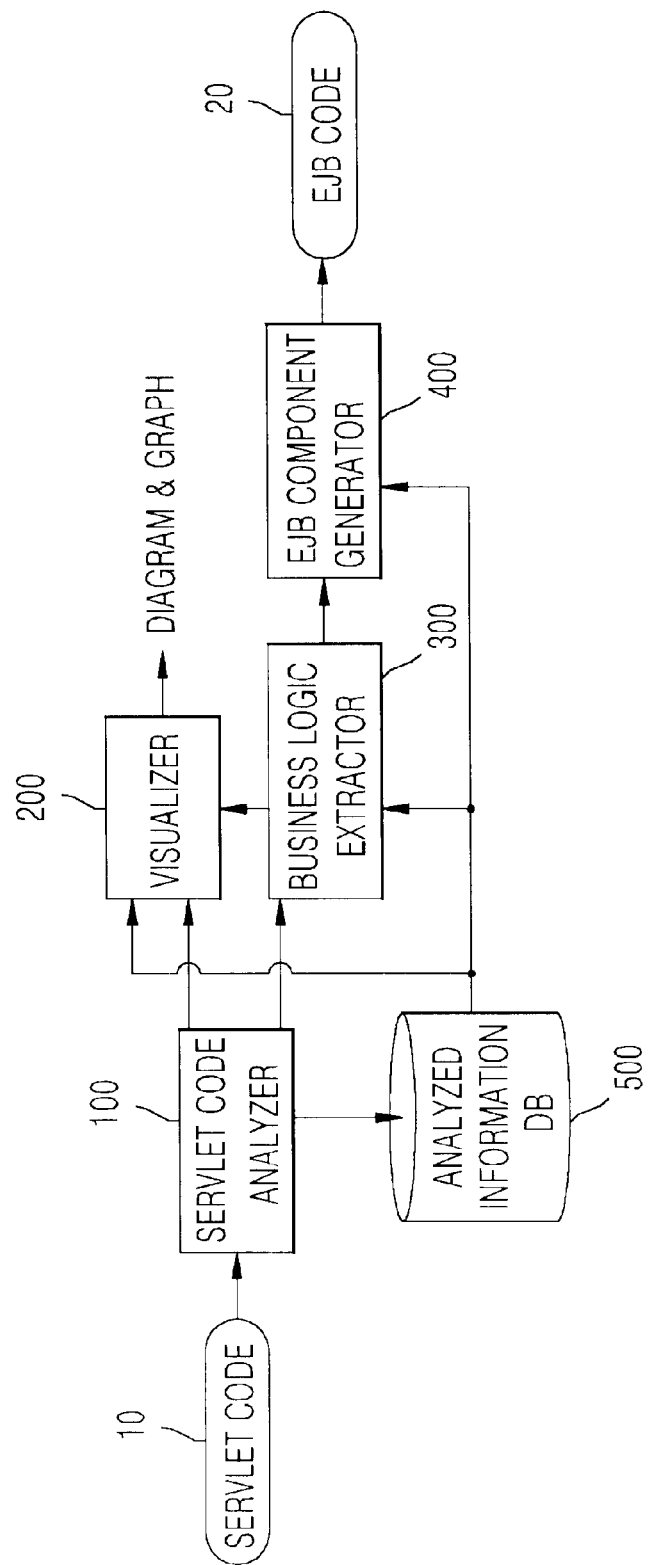
FIG. 1 is a block diagram illustrating the whole construction of a system for generating EJB components from business logics of a servlet program according to the present invention.

FIG. 1 is a block diagram illustrating the whole construction of a system for generating EJB components from business logics of a servlet program according to the present invention.

Referring to FIG. 1, a servlet code analyzer 100 according to the present invention analyzes servlet codes into information required for a visualizer 200, a business logic extractor 300 and an EJB component generator 400, and stores the analyzed information in an analyzed information database (DB) 500.

The visualizer 200 provides by way of diagrams and graphs information on a structure of a servlet received through the servlet code analyzer 100 and component information extracted by the business logic extractor 300.

The business logic extractor 300 extracts information required for generating the EJB components using the analyzed business logic information and SQL information. The EJB component generator 400 generates EJB codes 20 in accordance with an EJB component specification using the extracted EJB component generation information.

Figure 2:
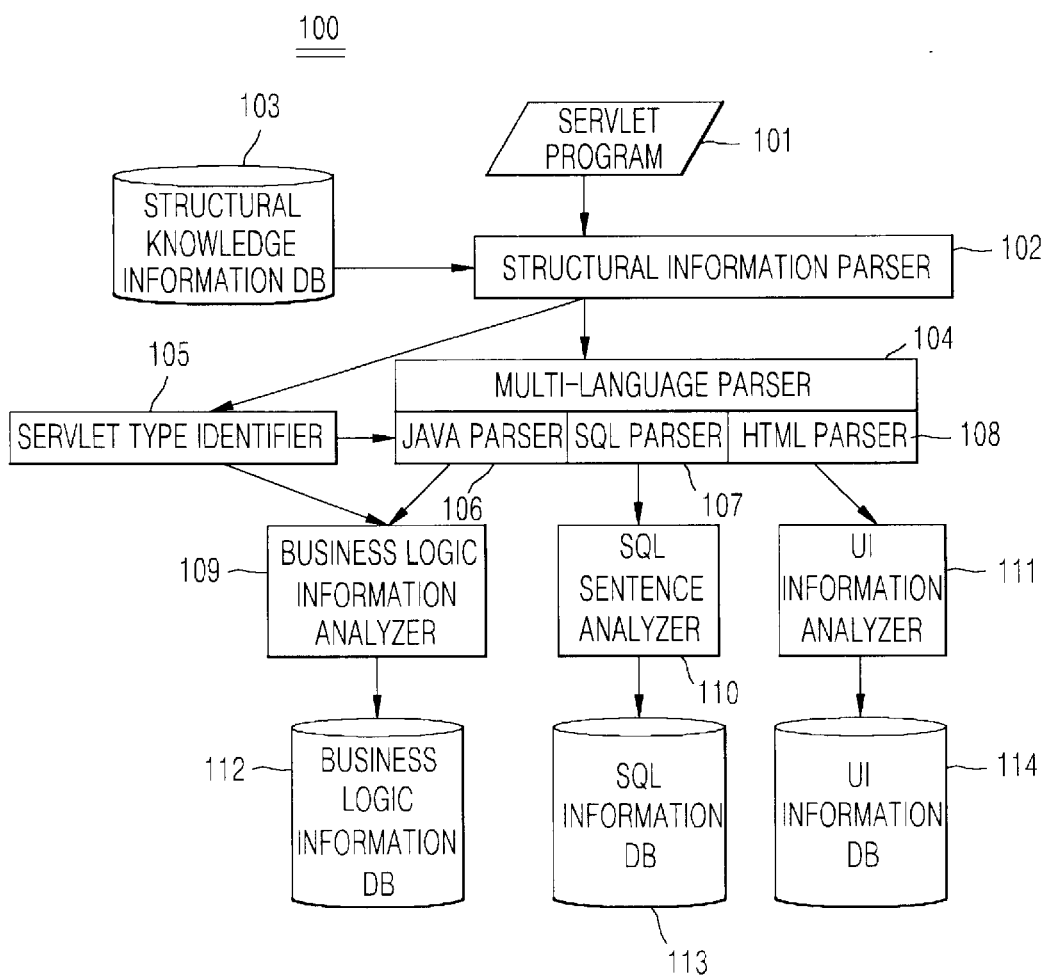
FIG. 2 is a block diagram illustrating the detailed construction of a servlet code analyzer that is a sub module according to the present invention.

FIG. 2 is a block diagram illustrating the detailed construction of the servlet code analyzer that is a sub module according to the present invention. The servlet code analyzer 100 includes a structural information parser 102, a multi-language parser 104, a servlet type identifier 105, a business logic information analyzer 109, an SQL sentence analyzer 110, and a user interface (UI) information analyzer 111. The servlet code analyzer 100 as constructed above analyzes an input servlet program 101, and stores analyzed information, i.e., business logic information 112, SQL information 113, and UI information 114 in the analyzed information DB.

Referring to FIG. 2, the structural information parser 102 parses the structure of the servlet program 101 using the structural knowledge information DB 103, and then provides results of parsing to the multi-language parser 104 and the servlet type identifier 105, respectively.

The multi-language parser 104 includes a java parser 106 for parsing java codes, an SQL parser 107 for parsing SQL sentences, and an HTML parser 108 for parsing HTML tags. The multi-language parser 104 analyzes the information parsed by the java parser 106 into the business logic information through the business logic information analyzer 109 to store the analyzed business logic information in the business logic information DB 112, analyzes the information parsed by the SQL parser 107 through the SQL sentence analyzer 110, and stores the SQL-related information in the SQL information DB 113. Also, the UI-related information obtained by the UI information analyzer 111 is stored in the UI information DB 114.

Here, the SQL information may be a select, insert, update, delete, etc., according to the kind of a query. Information on the DB table can be obtained through the query, and this information can be used as information for extracting entity beans of the EJB.

Figure 3:
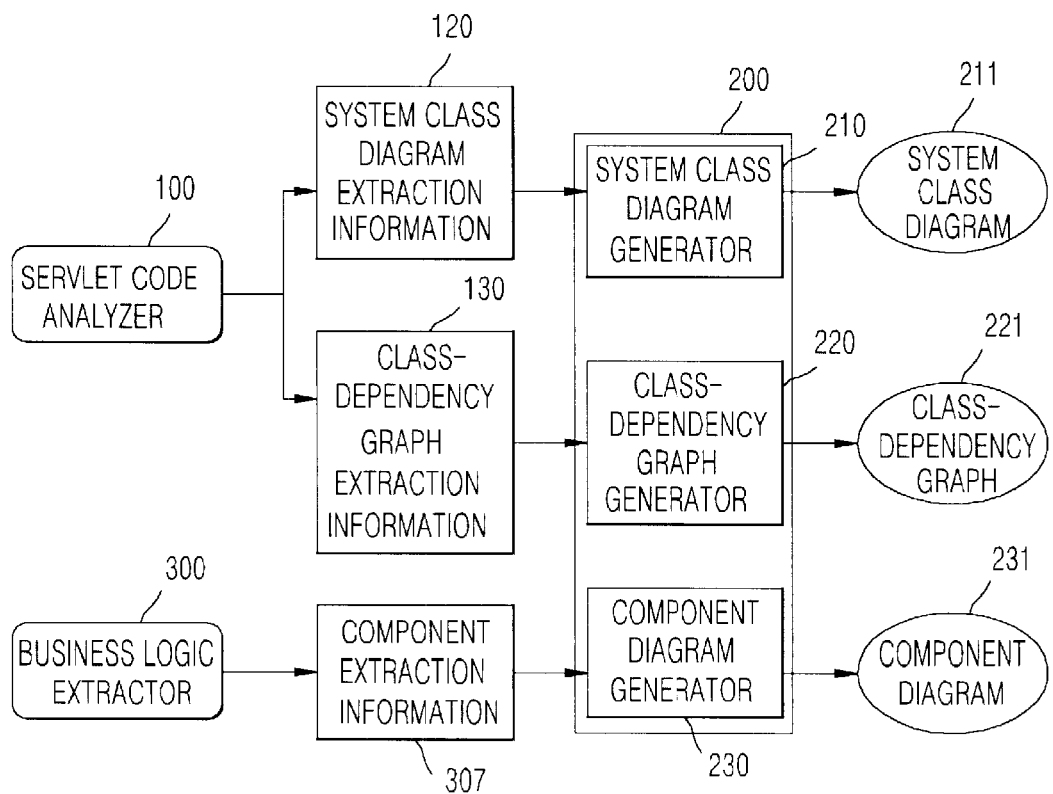
FIG. 3 is a block diagram illustrating the detailed construction of a visualizer that is a sub module according to the present invention.

FIG. 3 is a block diagram illustrating the detailed construction of the visualizer that generates diagrams provided for a user's understanding according to the present invention.

Referring to FIG. 3, the visualizer 200 includes a system class diagram generator 210, a class-dependency graph generator 220, and a component diagram generator 230.

The system class diagram generator 210 receives system class diagram extraction information 120 from the servlet code analyzer 100, and generates a system class diagram 211. This system class diagram 211 is a diagram that represents structures of java classes included in the inputted servlet programs.

In the same manner, the class-dependency graph generator 220 receives class-dependency graph extraction information 130 from the servlet code analyzer 100, and generates a class-dependency graph 221. This class-dependency graph 221 is a graph that expresses an inheritance relation and an instance generation relation by java classes.

The component diagram generator 230 receives component extraction information 307 from the business logic extractor 300, and generates a component diagram 231. This component diagram 231 visualizes the extracted components to the user.

Figure 4:
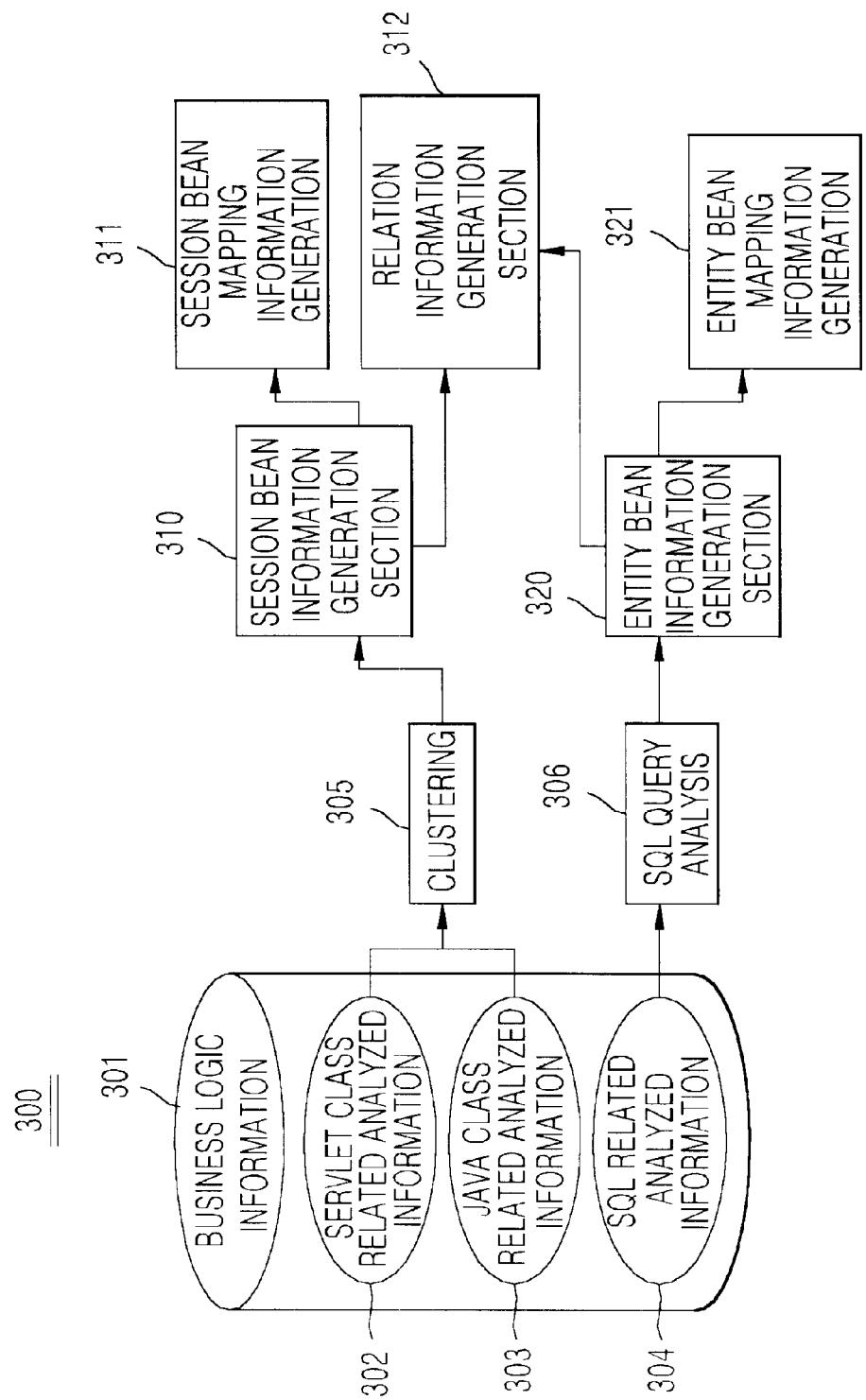
FIG. 4 is a block diagram illustrating the detailed construction of a business logic extractor that is a sub module according to the present invention.

FIG. 4 is a block diagram illustrating the detailed construction of the business logic extractor that generates mapping information of session beans and entity beans using the analyzed information according to the present invention.

The business logic extractor 300 generates session bean mapping information 311 and entity bean mapping information 321 using business logic information stored in the business logic information DB 301. A session bean information generation section 310 generates the session bean mapping information by clustering 305 servlet class related analyzed information 302 analyzed by the servlet code analyzer 100 and java class related analyzed information 303. Here, the clustering section 305 serves to tie java classes required for performing one servlet file.

An entity bean information generation section 320 generates the entity bean mapping information using SQL-related analyzed information 304 analyzed by the servlet code analyzer 100. A relation information generation section 312 generates necessary information so that the session bean calls and uses the entity bean. The generated session bean mapping information 311 and the entity bean mapping information 321 are inputted to the EJB component generator 400.

Figure 5:
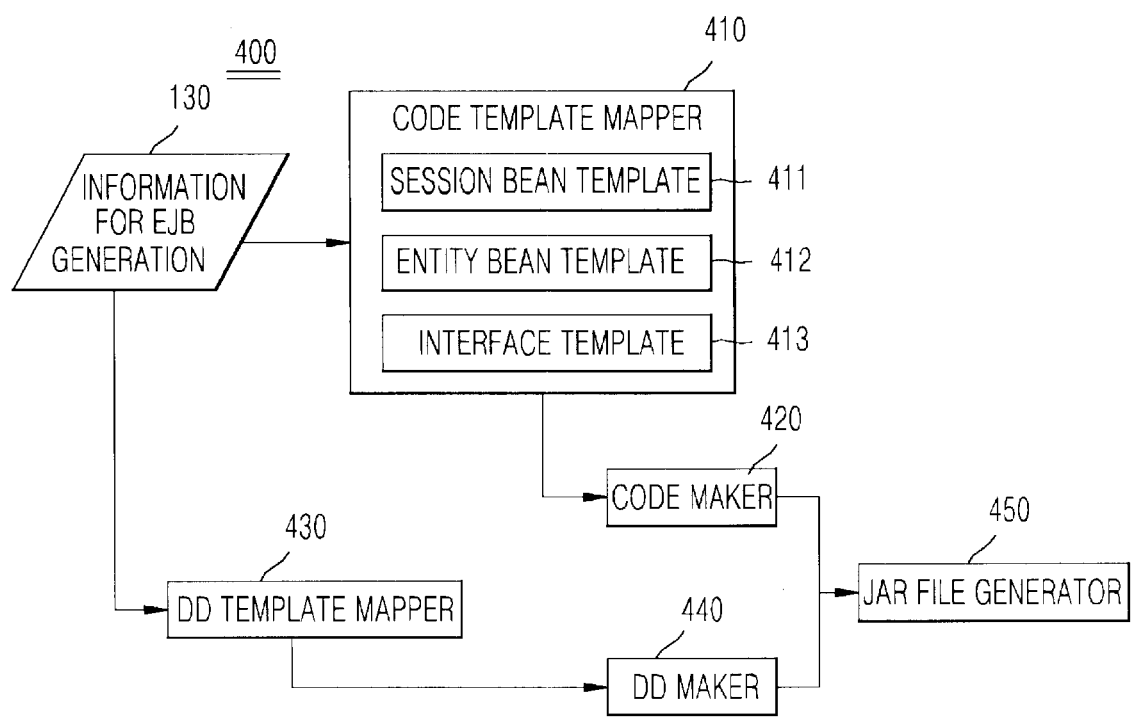
FIG. 5 is a block diagram illustrating the detailed construction of an EJB component extractor that is a sub module according to the present invention.

FIG. 5 is a block diagram illustrating the detailed construction of the EJB component extractor that generates even the java compression file (i.e., jar file) using the EJB component generation information extracted by the EJB component generator.

Referring to FIG. 5, the EJB component generator 400 has a code template mapper 410 that includes a session bean template 411, an entity bean template 412, and an interface template 413 to match the java EJB specification, and adds the session bean mapping information 311 and the entity bean mapping information 321 provided from the business logic extractor 300 to the respective templates.

A code maker 420 generates actual EJB beans using templates and inputted program source codes. A deployment descriptor (DD) required for the EJB components to be actually deployed is generated by a DD maker 440 through a DD template mapper 430, and the generated EJB beans and the DD are tied in a jar file by a jar file generator 450.

Figure 6:
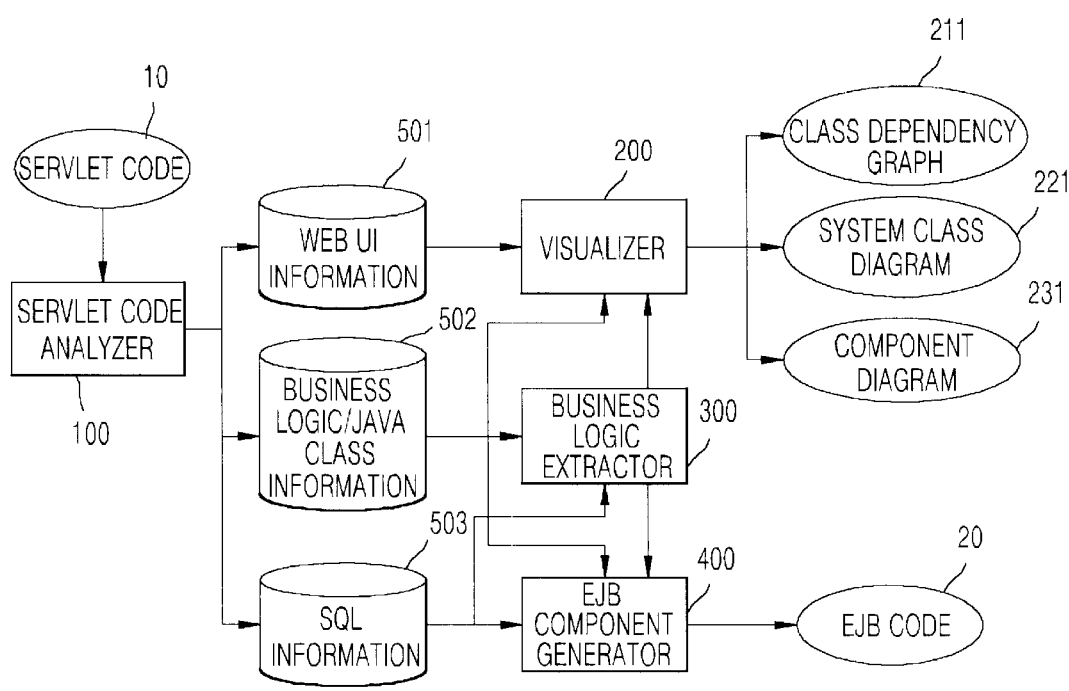
FIG. 6 is a flowchart illustrating the process of generating EJB codes from servlet codes according to the present invention.

FIG. 6 is a flowchart illustrating the process of generating EJB codes from servlet codes received through a mutual corporation among modules according to the present invention.

Referring to FIG. 6, the servlet code analyzer 100 analyzes input servlet codes 10 into web UI information 501, business logic/java class information 502 and SQL information 503 required for the visualizer 200, the business logic extractor 300 and the EJB component generator 400, and provides the analyzed information to the respective modules.

The visualizer 200 provides pictures such as a class-dependency graph 211, a system class diagram 221 and a component diagram 231, etc. for the user's understanding using the web UI information 501 and the business logic/java class information 502 provided from the servlet code analyzer 100.

The business logic extractor 300 extracts the business logic using the provided business logic information/java class information 502, and provides the extracted information to the EJB component generator 400 simultaneously with providing of information so that the visualizer 200 can generate the component diagram 231. The EJB component generator 400 generates EJB codes 20 which are the actual codes of the EJB component using the SQL information 503 and the business logic extraction information.

As described above, the present invention has the following advantages. First, it can provide the static analysis so that the user can easily understand the existing servlet codes through the diagrams and graphs of the visualizer. Second, it can easily analyze the business logic from diverse servlet codes irrespective of the existence of the flexibility of the java language and the disordered existence of the user interface (UI) and the business logic in the servlet program. Third, it can provide information for the EJB entity bean component extraction by analyzing the SQL language included in the servlet. Fourth, it can analyze information on the user interface included in the servlet by analyzing the HTML language. Fifth, it can perform clustering of the necessary java classes so that the extracted business logic can be executed. Sixth, it can automatically make the EJB codes from the extracted business logic, and can tie the EJB codes in a jar file that can be deployed by adding the DD file to the codes.

While the system and method for generating EJB components from reusable business logics in a servlet program according to the present invention has been described and illustrated herein with reference to the preferred embodiment thereof, it will be understood by those skilled in the art that various changes and modifications may be made to the invention without departing from the spirit and scope of the invention, which is defined in the appended claims.

What is claimed is:

1. A system for generating enterprise java beans (EJB) components from reusable business logics in a servlet program, the apparatus comprising:

a servlet code analyzer for receiving servlet codes, analyzing business logic information, SQL information and user interface (UI) information using a structural knowledge information, and storing analyzed information in an analyzed information database;

a business logic extractor for extracting information required for generating the EJB components using the analyzed business logic information and SQL information from the servlet code analyzer; and an EJB component generator for generating EJB codes in accordance with an EJB component specification using the extracted EJB component generation information.

2. The system of claim 1, further comprising a visualizer for providing by way of diagrams and graphs servlet structure information received through the servlet code analyzer and component information extracted by the business logic extractor, and an EJB component generator for generating EJB codes in accordance with an EJB component specification using the extracted EJB component generation information.

3. The system of claim 2, wherein the visualizer comprises:
- a system class diagram generator 210 for receiving system class diagram extraction information from the servlet code analyzer, and generating a system class diagram;
- a class-dependency graph generator for receiving class-dependency graph extraction information from the servlet code analyzer, and generating a class-dependency graph; and
- a component diagram generator for receiving component extraction information from the business logic extractor, and generating a component diagram.

4. The system of claim 1, wherein the servlet code analyzer comprises:
- a structural information parser for parsing a structure of the servlet program using structural knowledge information database (DB);
- a multi-language parser, comprising a java parser for parsing java codes, an SQL parser for parsing SQL sentences, and an HTML parser for parsing HTML tags, for parsing an output of the structural information parser;
- a servlet type identifier for receiving the output of the structural information parser, and identifying the servlet type;
- a business logic information analyzer for receiving information parsed by the java parser and identification information of the servlet type identifier, analyzing business logic information, and storing the analyzed business logic information in a business logic information DB;
- an SQL sentence analyzer for analyzing information parsed by the SQL parser, and storing the analyzed information in an SQL information DB; and
- a user interface (UI) information analyzer for analyzing information parsed by the HTML parser, and storing the analyzed information in a UI information DB.

5. The system of claim 1, wherein the business logic extractor comprises a session bean information generation section for generating session bean mapping information by clustering servlet class related analyzed information of the business logic information DB and java class related analyzed information, an entity bean generation section for receiving SQL-related analyzed information from the SQL information DB, and generating entity bean mapping information by analyzing an SQL query, and a relation information generation section for generating relation information between the session bean and the entity bean.

6. The system of claim 1, wherein the EJB component generator comprises:
- a code template mapper for receiving an output of the business logic extractor, and completing a session bean template, an entity bean template, and an interface template;
- a deployment descriptor (DD) template mapper for receiving an output of the business logic extractor, and completing a DD template;
- a code maker for generating actual beans using the templates and inputted program source codes;
- a DD maker for receiving an output of the DD template mapper, and generating the DD; and
- a jar file generator for generating a jar file by integrating the generated beans and DD.

7. A method for generating enterprise java beans (EJB) components from reusable business logics in a servlet program, the method comprising:
- a servlet code analyzing step of receiving servlet codes, and analyzing business logic information, SQL information and user interface (UI) information using a structural knowledge information;
- a business logic extracting step of extracting information required for generating the EJB components using the business logic information and SQL information analyzed at the servlet code analyzing step;
- a visualizing step of providing servlet structure information analyzed at the servlet code analyzing step and component information extracted at the business logic extracting step by way of a system class diagram, a class-dependency graph and a component diagram; and
- an EJB component generating step of generating EJB codes in accordance with an EJB component specification using the information extracted at the business logic extracting step.

8. The method of claim 7, wherein the servlet code analyzing step comprises the steps of:
- analyzing structures of inputted servlet programs using structural knowledge information DB;
- analyzing DB-related information and query-related information from an SQL sentence included in the servlet using an SQL analyzer; and
- analyzing user interface information from an HTML included in the servlet using an HTML analyzer.

9. The method of claim 8, wherein the structural knowledge information DB of the servlet is divided into an inheritance class from an http servlet class and a non-inheritance class, and includes inheritance relations and instance generation relation information, and the inheritance class includes link information to an HTML file.

10. The method of claim 8, wherein the kind of the SQL sentence analysis is classified into a select, insert, update, delete, etc., information on the DB table is obtained through the query, and this information is used for extracting entity beans of the EJB.

11. The method of claim 8, wherein the HTML analysis is to analyze tags of the HTML with respect to an web page branch or a structure of an web page frame-work, a path for an included image file, information on a linked file, information on an HTML basic component, etc.

12. The method of claim 7, wherein the system class diagram indicates information on an inheritance relation among classes, methods and variables constituting the class.

13. The method of claim 7, wherein the class-dependency graph indicates by classes information required for class generation including parent class information, information on the instance generated in the class, and information on linked HTML documents and related files in case of the servlet class.

14. The method of claim 7, wherein the component diagram includes EJB beans information generated when the extracted business logic is converted into components, EJB interface beans information, and DD information, and indicates the classes and methods clustered in the component.

15. The method of claim 7, wherein the business logic extracting step performs the clustering of the respective inheritance classes of the http servlet class, and extracts parameter information of a constructor method required for generating the instance of the classes and parameter information required for calling a method of another class.

16. The method of claim 7, wherein the EJB component generating step completes an empty code portion of a template after making a template file to match an EJB specification using business logic extraction information and inputted source codes.

17. The system of claim 2, wherein the servlet code analyzer comprises:
- a structural information parser for parsing a structure of the servlet program using structural knowledge information database (DB);
- a multi-language parser, comprising a java parser for parsing java codes, an SQL parser for parsing SQL sentences, and an HTML parser for parsing HTML tags, for parsing an output of the structural information parser;
- a servlet type identifier for receiving the output of the structural information parser, and identifying the servlet type;
- a business logic information analyzer for receiving information parsed by the java parser and identification information of the servlet type identifier, analyzing business logic information, and storing the analyzed business logic information in a business logic information DB;
- an SQL sentence analyzer for analyzing information parsed by the SQL parser, and storing the analyzed information in an SQL information DB; and
- a user interface (UI) information analyzer for analyzing information parsed by the HTML parser, and storing the analyzed information in a UI information DB.

18. The system of claim 2, wherein the business logic extractor comprises a session bean information generation section for generating session bean mapping information by clustering servlet class related analyzed information of the business logic information DB and java class related analyzed information, an entity bean generation section for receiving SQL-related analyzed information from the SQL information DB, and generating entity bean mapping information by analyzing an SQL query, and a relation information generation section for generating relation information between the session bean and the entity bean.

19. The system of claim 2, wherein the EJB component generator comprises:
- a code template mapper for receiving an output of the business logic extractor, and completing a session bean template, an entity bean template, and an interface template;
- a deployment descriptor (DD) template mapper for receiving an output of the business logic extractor, and completing a DD template;
- a code maker for generating actual beans using the templates and inputted program source codes;
- a DD maker for receiving an output of the DD template mapper, and generating the DD; and
- a jar file generator for generating a jar file by integrating the generated beans and DD.

* * * * *